US010083638B2

(12) United States Patent
Lin

(10) Patent No.: US 10,083,638 B2
(45) Date of Patent: Sep. 25, 2018

(54) EDGE SIDE DISPLAY DEVICE FOR A CHAIR

(71) Applicant: SPEC SEATS TECHNOLOGIES INC., Chung-Li, Taoyuan Hsien (TW)

(72) Inventor: Mei Chuen Lin, Chung-Li (TW)

(73) Assignee: SPEC SEATS TECHNOLOGIES INC., Chung-Li (TW)

( * ) Notice: Subject to any disclaimer, the term of this patent is extended or adjusted under 35 U.S.C. 154(b) by 0 days.

(21) Appl. No.: 15/425,725

(22) Filed: Feb. 6, 2017

(65) Prior Publication Data

US 2018/0226004 A1  Aug. 9, 2018

(51) Int. Cl.

| | | |
|---|---|---|
| *F21S 4/22* | (2016.01) | |
| *F21L 13/06* | (2006.01) | |
| *G09F 13/04* | (2006.01) | |
| *G09F 23/00* | (2006.01) | |
| *A47C 4/20* | (2006.01) | |
| *A47C 7/40* | (2006.01) | |
| *A47C 7/72* | (2006.01) | |
| *G09F 13/06* | (2006.01) | |
| *G09F 13/22* | (2006.01) | |
| *F21V 8/00* | (2006.01) | |
| *F21V 23/02* | (2006.01) | |
| *F21V 3/00* | (2015.01) | |
| *F21V 23/00* | (2015.01) | |
| *F21Y 115/10* | (2016.01) | |
| *F21Y 103/10* | (2016.01) | |
| *F21S 4/24* | (2016.01) | |

(52) U.S. Cl.
CPC ............... *G09F 23/00* (2013.01); *A47C 4/20* (2013.01); *A47C 7/40* (2013.01); *A47C 7/725* (2013.01); *F21V 3/00* (2013.01); *F21V 23/005* (2013.01); *F21V 23/02* (2013.01); *G02B 6/006* (2013.01); *G02B 6/0055* (2013.01); *G09F 13/06* (2013.01); *G09F 13/22* (2013.01); *F21S 4/24* (2016.01); *F21Y 2103/10* (2016.08); *F21Y 2115/10* (2016.08); *G09F 2013/222* (2013.01); *G09F 2023/005* (2013.01)

(58) Field of Classification Search
CPC .. F21Y 2115/10; F21Y 2103/10; G09F 23/00; G09F 13/04; G09F 2023/005; G09F 3/10; F21S 4/28
See application file for complete search history.

(56) References Cited

U.S. PATENT DOCUMENTS 2,516,243 A * 7/1950 Murphy .................. A47C 7/62
  40/320
2,770,903 A * 11/1956 Schmidt .................. G09F 23/00
  40/320

(Continued)

*Primary Examiner* — Shin H Kim
(74) *Attorney, Agent, or Firm* — Rabin & Berdo, P.C.

(57) ABSTRACT

An edge side display device for a chair includes a retention channel of a dovetail shape in cross section; and a plastic strip for embedding within the retention channel. The chair includes a chair body having a peripheral edge side formed with the retention channel. After being embedded, the plastic strip has an upper side surface exposed from the retention channel and having a pattern such that the pattern is visible from the exterior of the retention channel. The pattern consists of word information, like a seat or a row number that is visible under a natural lighting environment to facilitate finding a designated chair.

6 Claims, 13 Drawing Sheets

(56) References Cited

U.S. PATENT DOCUMENTS

| | | | | |
|---|---|---|---|---|
| 3,086,308 A * | 4/1963 | Ternouth | ................... | G09F 3/20 |
| | | | | 312/234.4 |
| 3,248,494 A * | 4/1966 | Barnes | ................... | F21V 23/04 |
| | | | | 200/51 R |
| 4,186,964 A * | 2/1980 | Marrujo | ................... | B60N 2/46 |
| | | | | 297/411.45 |
| 4,593,486 A * | 6/1986 | Visocky | ................... | G09F 3/20 |
| | | | | 40/490 |
| 5,193,895 A * | 3/1993 | Naruke | ................... | B60Q 1/323 |
| | | | | 362/249.01 |
| 5,220,739 A * | 6/1993 | Chich | ................... | G09F 13/04 |
| | | | | 40/550 |
| 5,329,716 A * | 7/1994 | Fite | ................... | A47C 7/725 |
| | | | | 136/291 |
| 5,590,504 A * | 1/1997 | Heard | ................... | G09F 7/18 |
| | | | | 248/218.4 |
| 5,636,897 A * | 6/1997 | Zapf | ................... | A47C 7/02 |
| | | | | 297/224 |
| 5,848,837 A * | 12/1998 | Gustafson | ................... | B64F 1/002 |
| | | | | 362/235 |
| 5,927,845 A * | 7/1999 | Gustafson | ................... | B64F 1/002 |
| | | | | 362/152 |
| 6,069,596 A * | 5/2000 | Marvin | ................... | G09F 3/204 |
| | | | | 345/52 |
| 6,113,248 A * | 9/2000 | Mistopoulos | ................... | F21V 23/06 |
| | | | | 362/219 |
| 6,540,240 B2 * | 4/2003 | Nadeau | ................... | B62B 3/144 |
| | | | | 280/33.993 |
| 6,578,795 B2 * | 6/2003 | Romca | ................... | B64D 11/00 |
| | | | | 116/209 |
| 6,866,394 B1 * | 3/2005 | Hutchins | ................... | E01F 9/582 |
| | | | | 362/192 |
| 7,104,599 B2 * | 9/2006 | Berger | ................... | B60N 3/004 |
| | | | | 108/134 |
| 7,383,654 B2 * | 6/2008 | Olivier | ................... | E05L 31/0015 |
| | | | | 40/331 |
| 7,574,822 B1 * | 8/2009 | Moore | ................... | G09F 3/204 |
| | | | | 40/575 |
| 7,681,346 B2 * | 3/2010 | Bruce | ................... | G09F 1/10 |
| | | | | 220/737 |
| 8,052,303 B2 * | 11/2011 | Lo | ................... | F21V 5/00 |
| | | | | 315/185 R |
| 8,408,773 B2 * | 4/2013 | Judge | ................... | B60Q 1/2696 |
| | | | | 362/605 |
| 8,641,229 B2 * | 2/2014 | Li | ................... | F21V 17/007 |
| | | | | 362/219 |
| 8,646,194 B2 * | 2/2014 | Podd | ................... | H05B 37/029 |
| | | | | 362/249.12 |
| 8,646,934 B2 * | 2/2014 | Fredricks | ................... | F21S 2/005 |
| | | | | 362/101 |
| 8,789,988 B2 * | 7/2014 | Goldwater | ................... | F21S 4/22 |
| | | | | 362/217.01 |
| 9,022,631 B2 * | 5/2015 | Mulder | ................... | G02B 6/006 |
| | | | | 362/601 |
| 9,032,651 B2 * | 5/2015 | Bruce | ................... | G09F 1/10 |
| | | | | 220/737 |
| 9,103,514 B2 * | 8/2015 | Pitkanen | ................... | F21S 4/006 |
| 9,399,844 B1 * | 7/2016 | King | ................... | G02B 6/0011 |
| 9,638,380 B2 * | 5/2017 | Kramer | ................... | F21V 15/013 |
| 9,781,805 B2 * | 10/2017 | Xiong | ................... | H05B 33/0842 |
| 9,801,240 B2 * | 10/2017 | Xiong | ................... | H05B 33/0809 |
| 2002/0116846 A1 * | 8/2002 | Wu | ................... | G09F 7/00 |
| | | | | 40/320 |
| 2006/0097552 A1 * | 5/2006 | Hampton | ................... | A47C 7/24 |
| | | | | 297/228.1 |
| 2007/0107277 A1 * | 5/2007 | Simms | ................... | G09F 3/00 |
| | | | | 40/320 |
| 2008/0236006 A1 * | 10/2008 | Chadwell | ................... | G09F 13/04 |
| | | | | 40/581 |
| 2010/0174590 A1 * | 7/2010 | Crowley | ................... | G06Q 30/0241 |
| | | | | 705/14.4 |
| 2011/0138664 A1 * | 6/2011 | Wells | ................... | G09F 13/04 |
| | | | | 40/541 |
| 2011/0265360 A1 * | 11/2011 | Podd | ................... | G09F 9/33 |
| | | | | 40/541 |
| 2012/0000102 A1 * | 1/2012 | Bruce | ................... | A47C 1/121 |
| | | | | 40/320 |
| 2012/0005928 A1 * | 1/2012 | Ella | ................... | A47C 31/113 |
| | | | | 40/320 |
| 2015/0332618 A1 * | 11/2015 | Bruce | ................... | G09F 23/00 |
| | | | | 40/320 |
| 2016/0106219 A1 * | 4/2016 | Stirling | ................... | A47C 11/00 |
| | | | | 297/440.2 |
| 2017/0181239 A1 * | 6/2017 | Xiong | ................... | H05B 33/0845 |

* cited by examiner

EDGE SIDE DISPLAY DEVICE FOR A CHAIR

BACKGROUND OF THE INVENTION

The present invention relates generally to an edge side display device, more particularly an edge side display device for mounting on a peripheral edge side of a foldable chair such that the edge side display device shows a pattern to be exposed from the foldable chair to facilitate in identifying the same.

BACKGROUND ART DISCUSSION

The foldable chairs or seats are preferred to the stationary ones due to its minimum storage space when folded and is easy for transportation for use outdoors.

FIG. 1 shows a perspective view of a conventional foldable chair 500, which includes a chair body having a seat 510, a pair of front legs 520 and a pair of rear legs 530, which are connected pivotally to two opposite sides of the seat 510 and which are connected pivotally relative to each other about pivot axles 540 below the seat 510. The pair of front legs 520 in fact has two straight front legs 521, 522 and a curved portion 523 integrally formed with the straight front legs 521, 522 to define a backrest 550 above the seat 510 such that the seated person can rest his back against the backrest 550 after seated on the seat 510. For storage and in use, rotation of the front and rear legs 520, 530 about the pivot axles 540 results in stretching-out of the conventional chair 500 or folding of the chair, thereby facilitating the use of the conventional foldable chair 500.

In a stadium or a music concert, a plurality of foldable chairs are arranged in rows in order to permit seating of audience for watching a game or concert according to the seat no they have bought. It is noted that the conventional seat has no seat number, and hence the concerned or concert organizer generally sticks the printed seat number at the back of the chair so as to facilitate in identifying the designated chair. Such type of chair identifying method is not ideal due to lacking fine external appearance and since the stuck printed seat number may fall off in the long run or can be easily torn by rowdy child or people, thereby creating a great deal of undesired problems.

SUMMARY OF THE INVENTION

A primary objective of the present invention is to provide an edge side display device for a foldable chair, in which a pattern consisting of words, seat numbers, symbols or emblems are displayed at the edge side of the foldable chair to facilitate in identifying the designated foldable chair.

An edge side display device for chair according to the present invention includes: a retention channel of a dovetail shape in cross section; and a plastic strip for embedding within the retention channel. The plastic strip has an upper side surface provided with a pattern to be exposed to an exterior of the retention channel such that the pattern is visible from the exterior of the retention channel. Preferably, the chair includes a chair body having a peripheral edge side formed with the retention channel. The pattern is formed by screen printing consists of words, totems, symbols or emblems. The plastic strip should have a profile complementing with the cross-sectional shape of the retention channel to facilitate the press-fitting in the retention channel.

The above-mentioned foldable chair includes a chair body having a seat, a pair of front legs and a pair of rear legs, which are connected pivotally to two opposite sides of the seat and which are connected pivotally relative to each other about pivot axles below the seat. The pair of front legs has two straight front legs and a curved portion integrally formed with the straight front legs to define a backrest above the seat such that the seated person can rest his back against the backrest after seated on the seat. Note that the retention channel is generally formed in an external edge of the curved portion of the front legs of the foldable chair.

In one embodiment of the present invention, the pattern is formed by screen printing technique and may consist of word information, such as seat serial numbers, but should not be limited only thereto. The content of the pattern can be varied according to the requirement of the task.

Since the pattern is formed on the external surface of the plastic strip via the screen printing technique, the pattern is easily seen under the natural lighting such that the participant or audience can find their seats or chairs more easily, thereby proving an integral fine appearance of the entire environment or the pattern is prevented from falling of the chair or being damaged.

In one embodiment of the present invention, the pattern has at least one transparent part such that word information constituting the remaining part of the pattern can be visible from an exterior of the retention channel via the transparent part.

In one embodiment of the present invention, the plastic strip defines a passage extending longitudinally along its entire length and a light emitting device is embedded within the passage and a power supply unit is coupled electrically with the light emitting device. Preferably, the power supply unit includes a battery seat mounted at one end of the plastic strip, a battery disposed within the battery seat and a protection cover detachably mounted on the end of the plastic strip for shielding the battery and the battery seat.

In one embodiment of the present invention, the light emitting unit includes a flexible light board that is inserted into the passage of the plastic strip and that is installed with a plurality of LEDs (Light Emitting Diodes) such that during the assembly, the LEDs are oriented toward the transparent part of the pattern. The LEDs are further coupled electrically with the power supply unit. Under this condition, the plastic strip can be press-fitted with the retention channel of the foldable chair, thereby finishing assembly of the edge side display device of the present invention in the foldable chair.

Upon activation of the power supply unit, the light rays emitted from the LEDs radiate outward to an exterior of the retention channel via the transparent part of the pattern, thereby displaying pattern which is visible from the exterior of the retention channel in the chair.

In one embodiment, the edge side display device of the present invention, further includes a signal receiver and a micro processor disposed on the flexible light board, The micro processor is coupled electrically with the power supply unit such that upon receipt of a control signal from a controller, the signal receiver transmits the control signal to the micro processor, which activates the power supply unit to supply power to the LEDs according to the control signal. To be more specific, the emitting light rays of the LEDs can be controlled by the controller.

In one embodiment of the present invention, the light emitting unit preferably includes a light guide plate, a light reflector and at least one LED coupled electrically to the power supply unit.

In the above embodiment, the edge side display device further includes a signal receiver and a micro processor disposed on one end of the light guide plate. The micro processor is coupled electrically with the power supply unit such that upon receipt of a control signal from a controller, the signal receiver transmits the control signal to the micro processor, which activates the power supply unit to supply power for the LED according to the control signal. To be more specific, activation or de-activation of the LED can be controlled from a remote place via the controller.

For assembly, the LED is disposed at one end of the light guide plate and is coupled electrically with the power supply unit. The light reflector is disposed at one side of the light guide plate such that upon activation of the power supply unit, a portion of light rays emitted from the LED is guided by the light guide plate and is radiated directly outwardly of the plastic strip through the transparent part while a remaining portion of the light rays is reflected from the light reflector so as to radiate outwardly of the plastic strip through the transparent part.

One distinct aspect of the present invention is that since the edge side display device of the present invention is installed in the external surface of the front legs of the foldable chair, the pattern consisting of word information, like seat serial numbers or symbols are visible by the audience due to light rays emitted from the LEDs, the troubles like falling off of the seat number from the chairs, finding one's seat in the dim environment with the assistance of a torch light as encountered during used of the conventional foldable chairs can be eliminated. In other words, the edge side display device of the present invention can be remotely controlled so as to provide comfort and convenience to the user of the foldable chair.

BRIEF DESCRIPTION OF THE DRAWINGS

The present invention will be apparent to those skilled in the art by reading the following detailed description of a preferred embodiment thereof, with reference to the attached drawings, in which:

FIG. 2-1 is a perspective view of a foldable chair provided with an edge side display device of the present invention;

FIG. 3-1 is a top planar view of a plastic strip in the edge side display device according to the first embodiment of the present invention;

FIG. 6-1 is a cross-sectional view of the edge side display device according to the second embodiment of the present invention in operation;

FIG. 7-1 is a block diagram illustrating the elements employed in the edge side display device according to the third embodiment of the present invention;

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
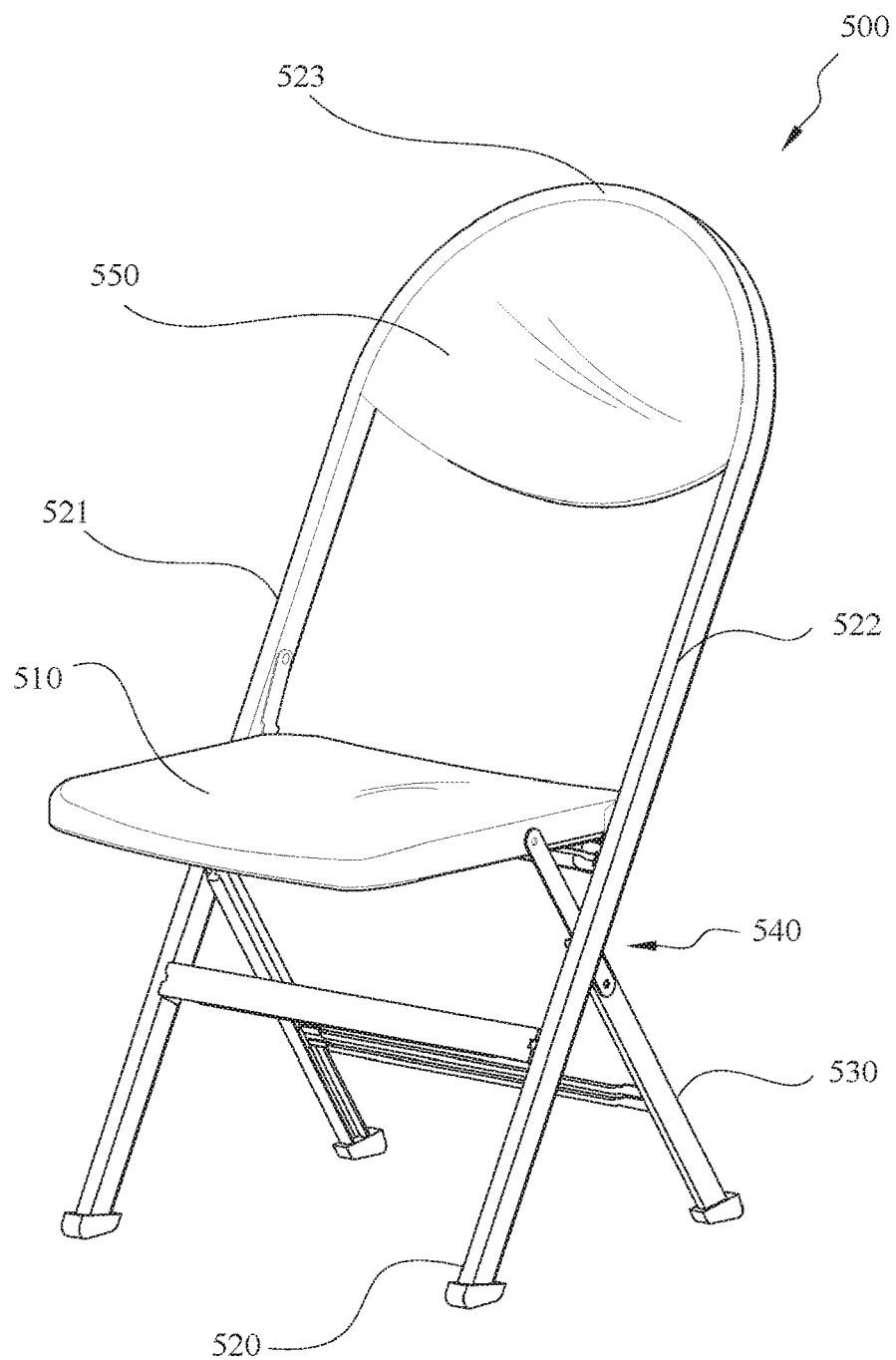
FIG. 1 is a perspective view of a conventional foldable chair.
Figure 2:
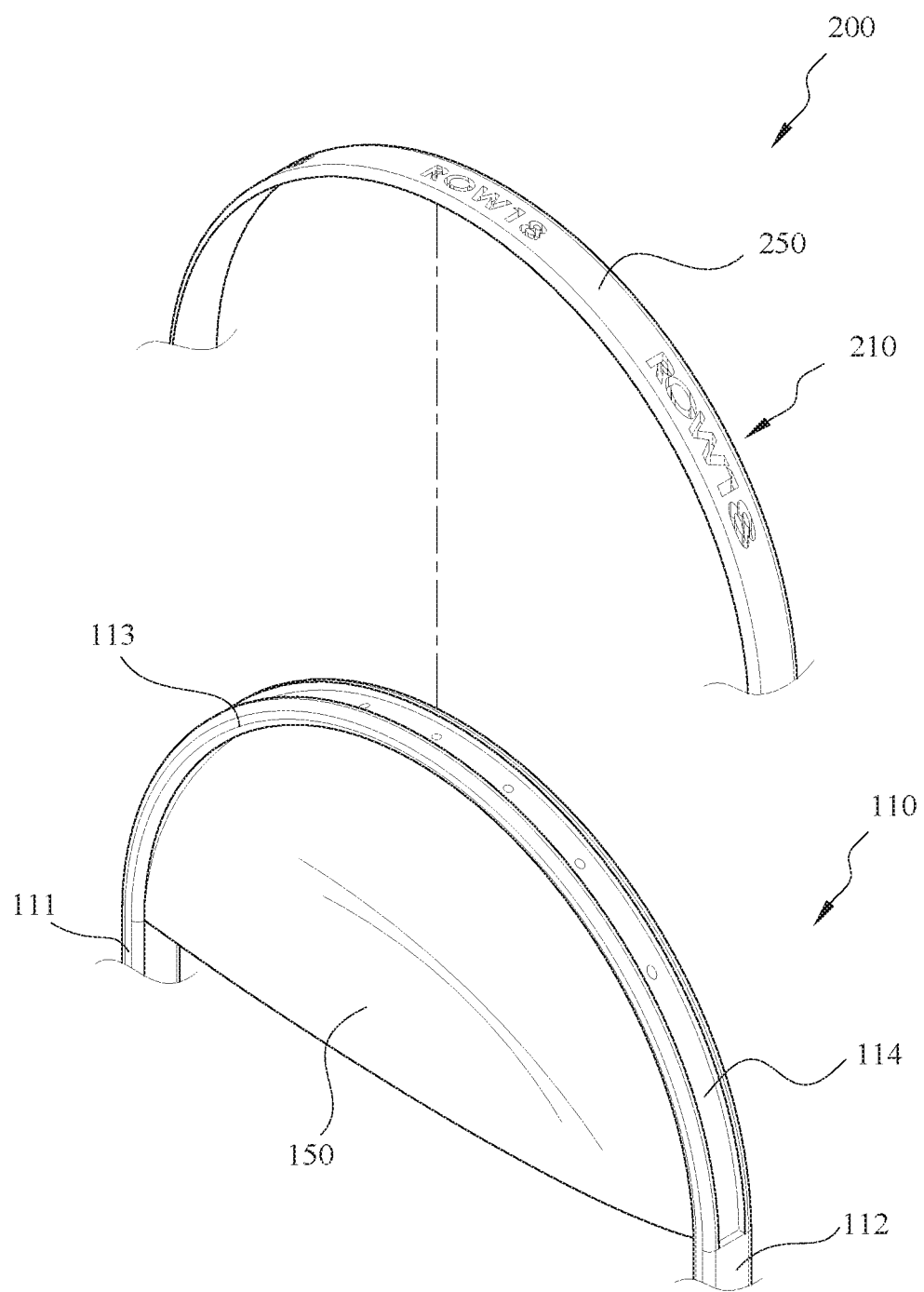
FIG. 2 is a perspective view of an edge side display device of the present invention for a foldable chair.
Figures 1, 2:
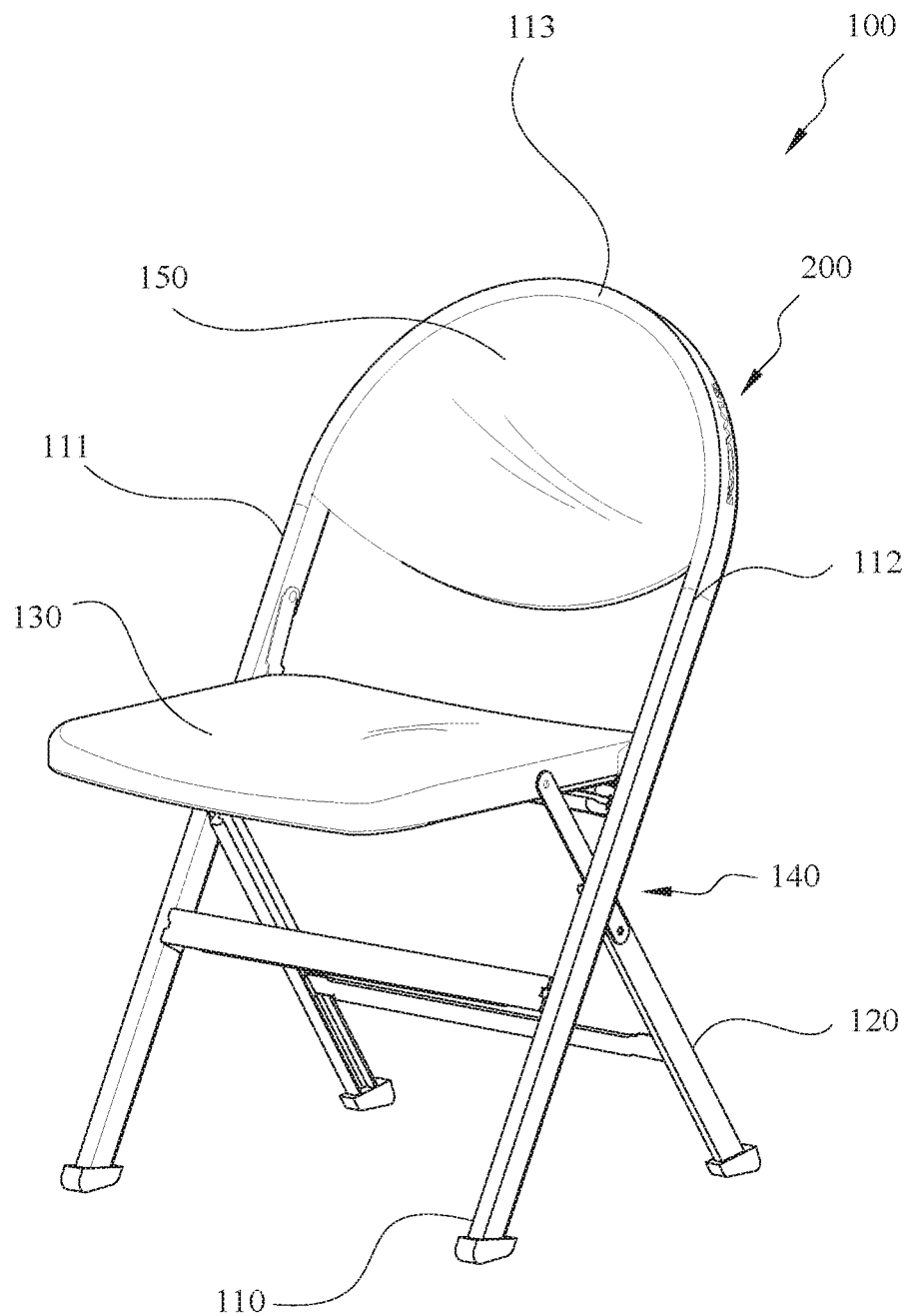

Referring to FIGS. 2 and 2-1, wherein FIG. 2 is a perspective view of an edge side display device of the present invention for a foldable chair and FIG. 2-1 is a perspective view of a foldable chair provided with an edge side display device of the present invention. As shown, an edge side display device for chair according to the present invention includes a retention channel 114 of a dovetail shape in cross section and an elongated plastic strip 200.

The foldable chair 100 includes a chair body having a seat 130, a pair of front legs 110 and a pair of rear legs 120, which are connected pivotally to two opposite sides of the seat 130 and which are connected pivotally relative to each other about pivot axles 140 below the seat 130 such that rotation of the front and rear legs 110, 120 about the pivot axles 140 results in moving the chair 100 between a stretching-out position and a folded position, thereby facilitating the use of the chair 100.

The pair of front legs 110 in fact is an integral piece, has two straight front legs 111, 112 and a curved portion 113 integrally formed with the straight front legs 111, 112 to define a backrest 150 above the seat 130 such that the seated person can rest his back against the backrest 150 after seated on the seat 130. In this embodiment, the curved portion 113 of the front legs 110 is semi-circular shaped, but should not be limited only to the same.

Figure 3:
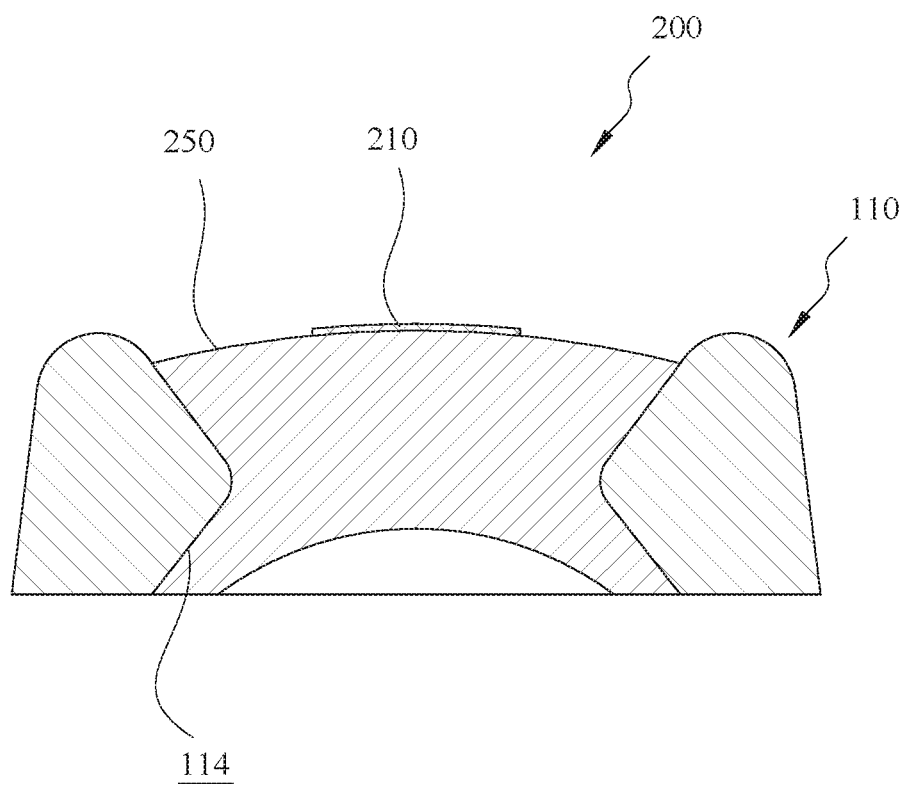
FIG. 3 is a cross-sectional view of an edge side display device according to a first embodiment of the present invention.
Figures 1, 3:
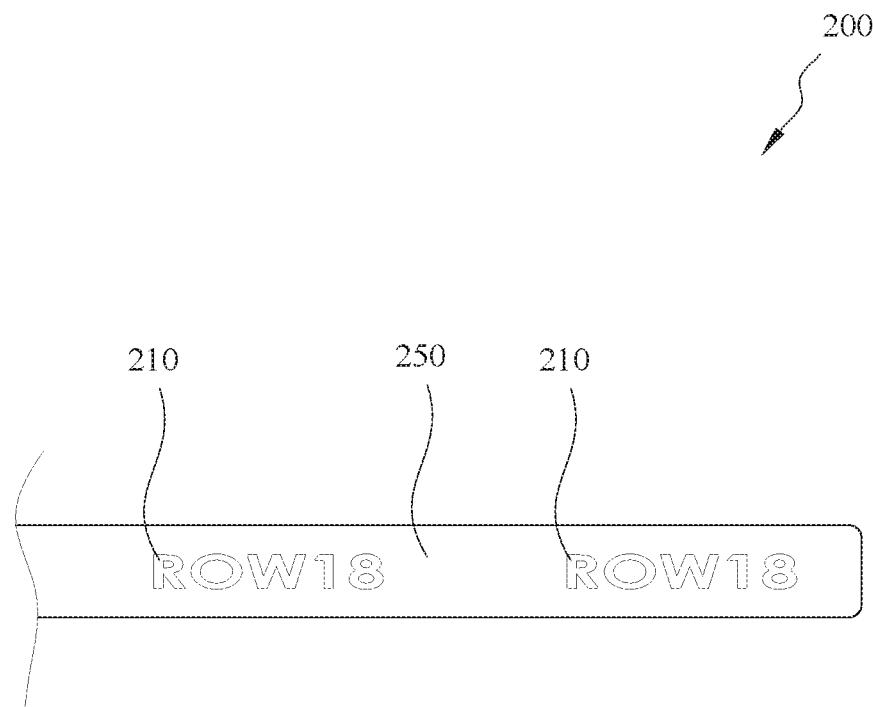

FIG. 3 is a cross-sectional view of an edge side display device according to a first embodiment of the present invention. As shown, the curved portion 113 of the front legs 110 has an external surface formed with the retention channel 114 of the dovetail shape in cross section such that two sides of the retention channel 114 converge gradually and inwardly toward each other from the top. The plastic strip 200 is embedded within the retention channel 114. In this embodiment, the plastic strip 200 has an upper side surface provided with a pattern 210 exposed to an exterior of the retention channel 114 such that the pattern 210 is visible from the exterior of the retention channel 114.

FIG. 3-1 is a top planar view of a plastic strip employed in the edge side display device according to the first embodiment of the present invention. Preferably, the pattern 210 is formed by screen printing technique and consists of words, totems, symbols and emblems. The pattern 210 may include seat or row numbers. In this embodiment, the pattern 210 indicates that the row number is 18, but should not be limited only thereto.

Because the pattern 210 is printed on the external surface 250 of the plastic strip 200, the entire appearance provide a consistency and uniform aesthetic while the seat number or the row number is visible by the natural lighting of the environment to facilitate the audience to locate their designated seat or chair. Moreover, unlike to the prior foldable chair, the seat number or the row number does not fall off the chair.

Figure 4:
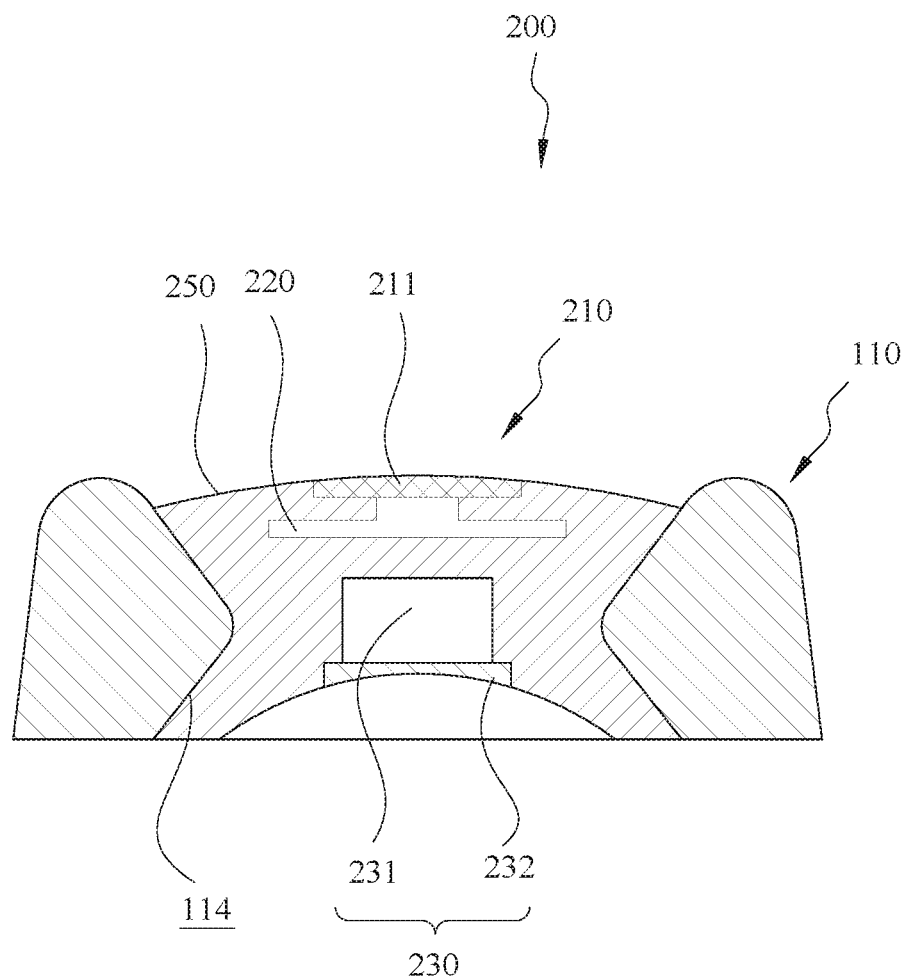
FIG. 4 is a cross-sectional view of an edge side display device according to a second embodiment of the present invention.
Figure 5:
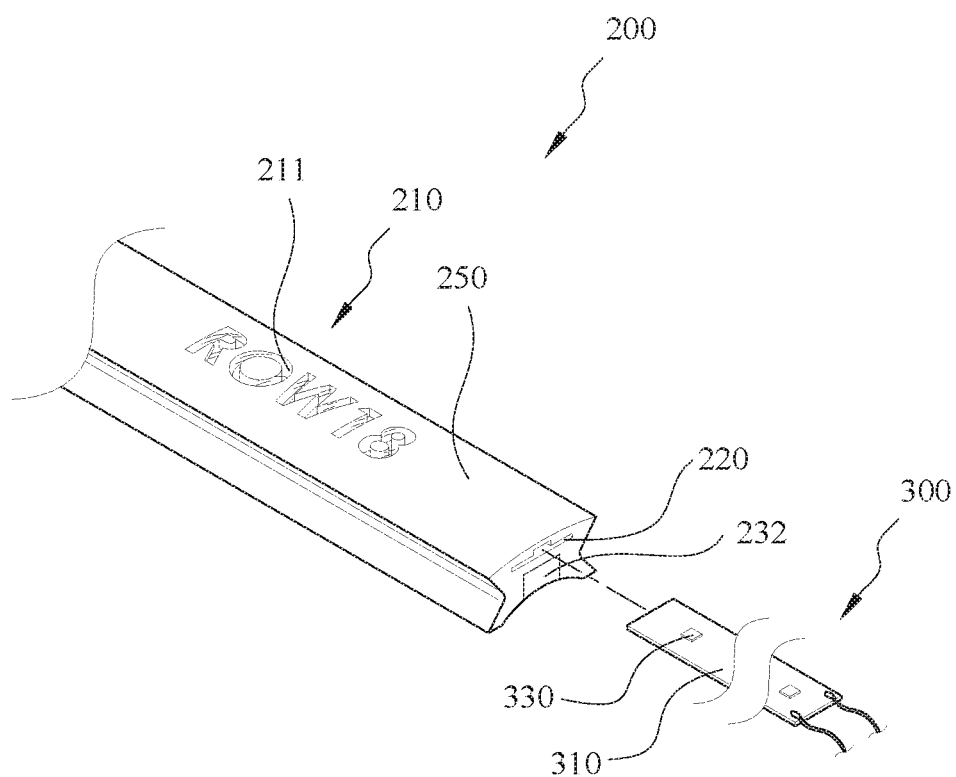
FIG. 5 is a perspective view of a plastic strip in the edge side display device according to the second embodiment of the present invention.

Referring to FIGS. 4 and 5, wherein FIG. 4 is a cross-sectional view of an edge side display device according to a second embodiment of the present invention and FIG. 5 is a perspective view of a plastic strip in the edge side display device according to the second embodiment of the present invention. The second embodiment is similar to the first embodiment, except that the plastic strip 200 defines an accommodation passage 220 extending longitudinally along its entire length and its two ends. A light emitting unit 300 is embedded within the passage 220 of the plastic strip 200 while a power supply unit 230 coupled electrically to the light emitting unit 300. Note that the pattern 210 has at least one transparent part 211.

Preferably, the power supply unit 230 includes a battery seat 231 mounted at one end of the plastic strip 200, a battery 240 disposed within the battery seat 231 and a protection cover 232 detachably mounted on the one end of the plastic 200 for shielding the battery 240 and the battery seat 231.

Note that since the transparent part 211 is located adjacent to the light emitting unit 300 such that when the former is activated, lighting rays emitted from the light emitting unit 300 radiate exteriorly of the plastic strip 200 via the transparent part 211 such that a portion of the pattern, like the row number 18, is visible via the transparent part 211, thereby facilitating the audience to easily locate ones seat or chair.

Preferably, the light emitting unit 300 includes a flexible light board 310 that is installed with a plurality of LEDs (Light Emitting Diodes) and that is coupled electrically with the power supply unit 230. In this embodiment, a flexible printed circuit board may serve as the flexible light board 310 and can be disposed in the curved portion 113 of the chair, so as to conceal present of the same from being visible, thereby providing consistent appearance of the edge side display device of the present invention.

Figure 6:
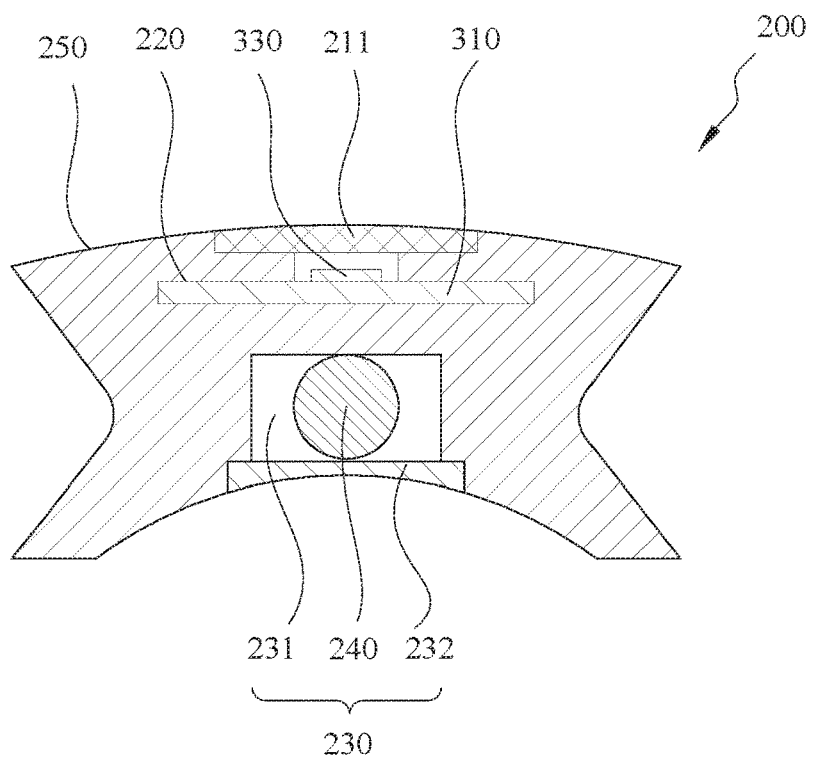
FIG. 6 is a cross-sectional view of the plastic strip in the edge side display device according to the second embodiment of the present invention.
Figures 1, 6:
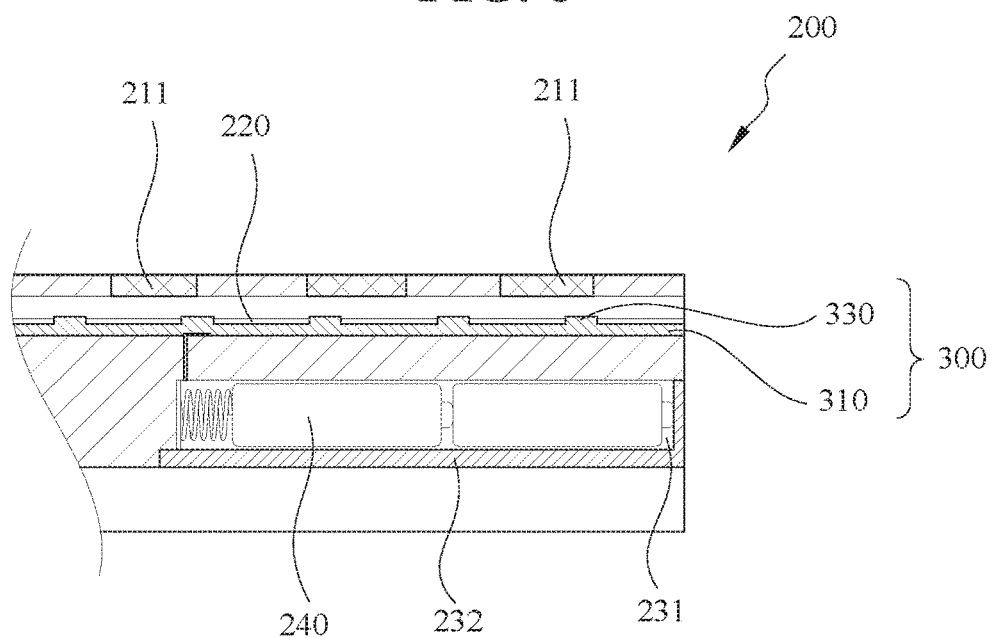

Referring to FIGS. 6 and 6-1, wherein, FIG. 6 is a cross-sectional view of the plastic strip employed in the edge side display device according to the second embodiment of the present invention and FIG. 6-1 is a cross-sectional view of the edge side display device according to the second embodiment of the present invention in operation. During assembly of the edge side display device of the present invention, the flexible light board 310 is inserted into the accommodation passage 220 in the plastic strip 200 in such a manner that the LED 330 is oriented toward the transparent part 211, after which the LED 330 is connected electrically with the power supply unit 230, and the whole assembly is disposed with the curved portion 113 of the chair. Upon activation of the power supply 230, the light rays emitted from the LED 330 radiate outward to an exterior of the plastic strip 200 via the transparent part 211.

Figure 7:
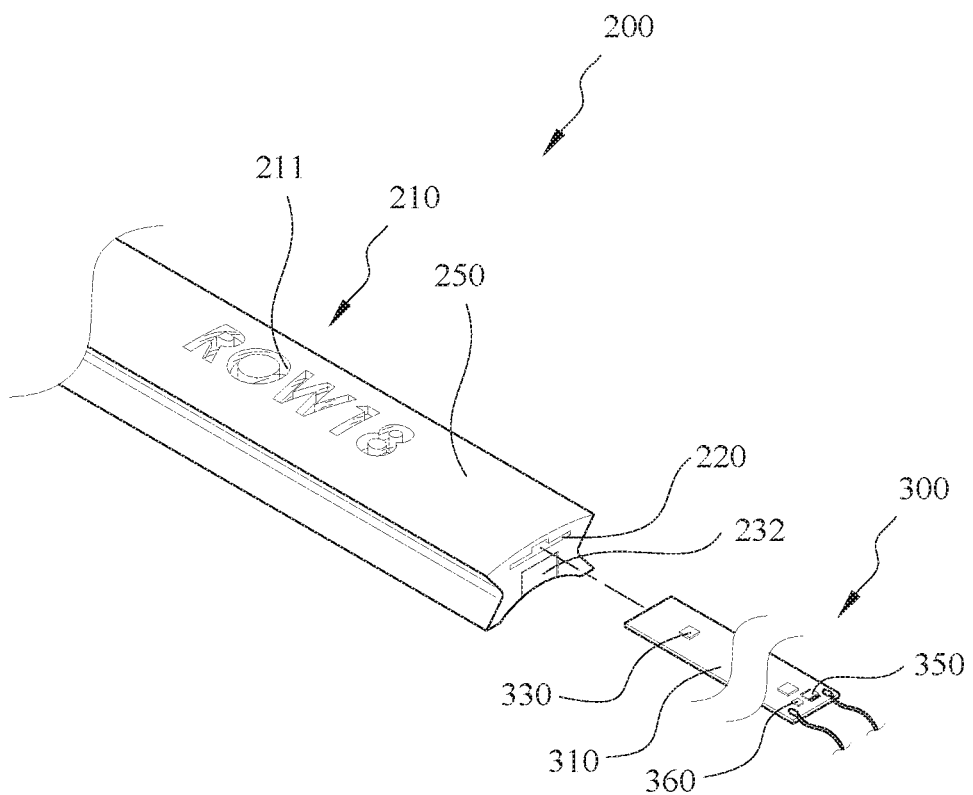
FIG. 7 is a perspective fragmentary view of the plastic strip employed in the edge side display device according to a third embodiment of the present invention.
Figures 1, 7:
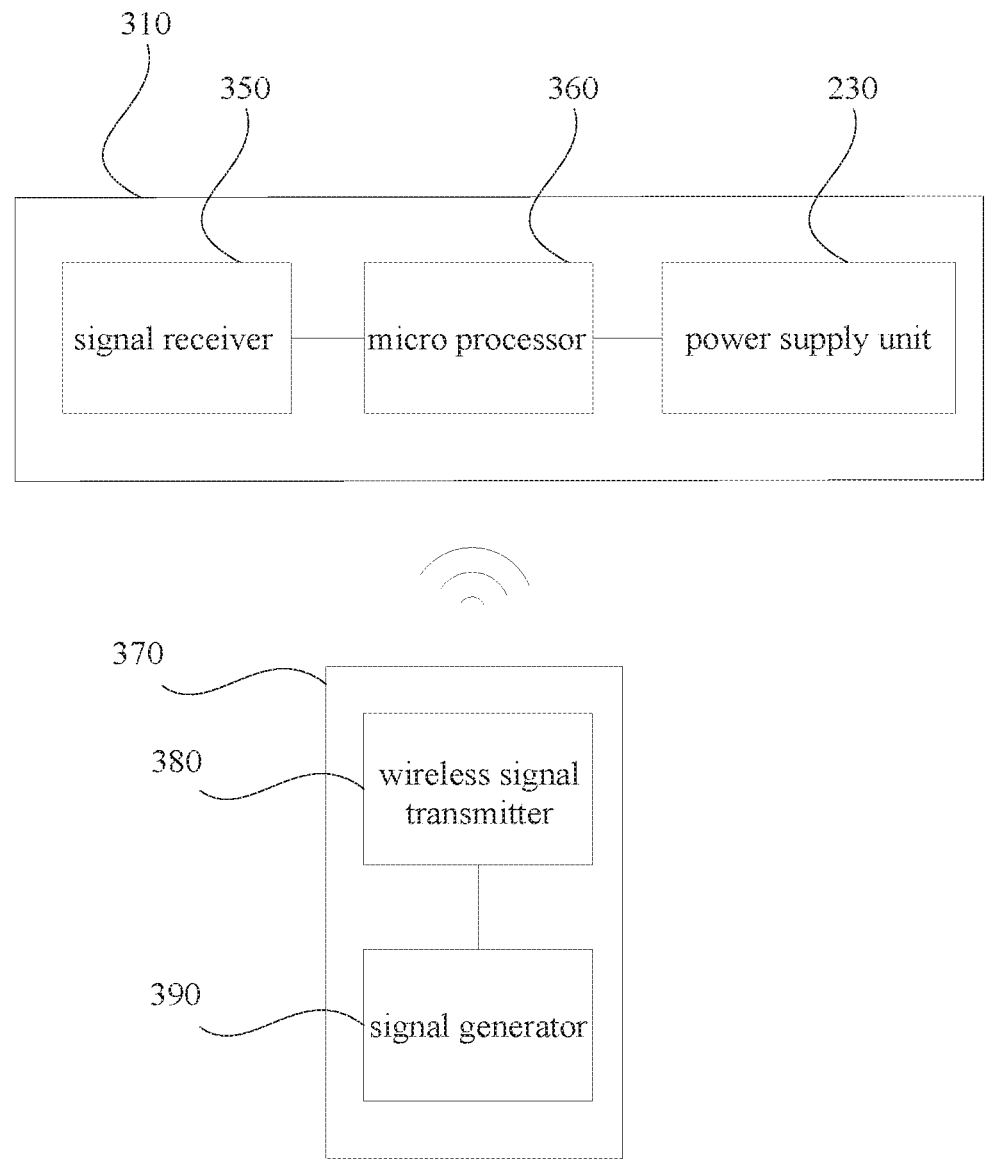

FIG. 7 is a perspective fragmentary view of the plastic strip employed in the edge side display device according to a third embodiment of the present invention; and FIG. 7-1 is a block diagram illustrating the elements employed in the edge side display device according to the third embodiment of the present invention. The third embodiment is similar to the previous embodiment, except in that a signal receiver 350 and a micro processor 360 are disposed on the flexible light board 310 while the micro processor 360 is coupled electrically with the power supply unit 230 such that upon receipt of a control signal from a controller 370, the signal receiver 350 transmits the control signal to the micro processor 360, which activates the power supply unit 230 to supply power according to the control signal. In this embodiment, a remote control serves as the controller 370 and includes a signal generator 390 for generating signals and a wireless signal transmitter 380 for transmission of the signal. In other words, the emitting light rays of the LED 330 can be controlled by a remote control.

Figure 8:
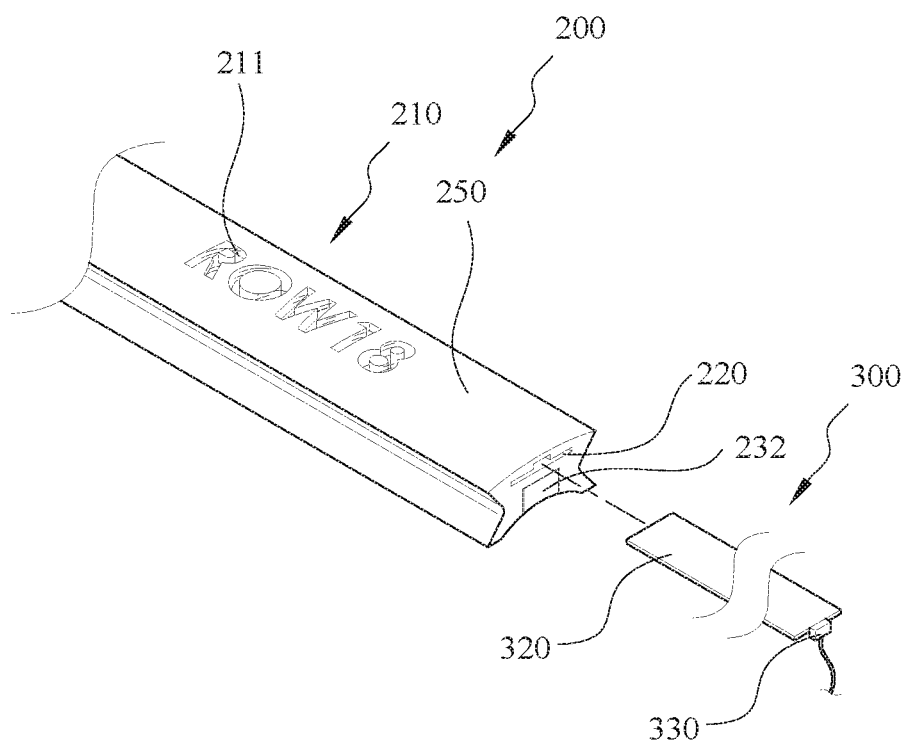
FIG. 8 is a perspective fragmentary view of the plastic strip employed in the edge side display device according to a fourth embodiment of the present invention.

FIG. 8 is a perspective fragmentary view of the plastic strip employed in the edge side display device according to a fourth embodiment of the present invention. The fourth embodiment is similar to the previous embodiment, except that the light emitting unit 300 includes a light guide plate 320, a light reflector 340 and at least one LED 330, wherein the LED 330 is disposed at one end of the light guide plate 320 and is coupled electrically with the power supply unit 230, the light reflector 340 is disposed at one side of the light guide plate 320.

During assembly of the edge side display device of the present invention, the light guide plate 320 is inserted into the accommodation passage 200 in the plastic strip 200, after which the light guide plate 320 is connected electrically with the power supply unit 230, and the whole assembly is disposed with the curved portion 113 of the chair.

Figure 9:
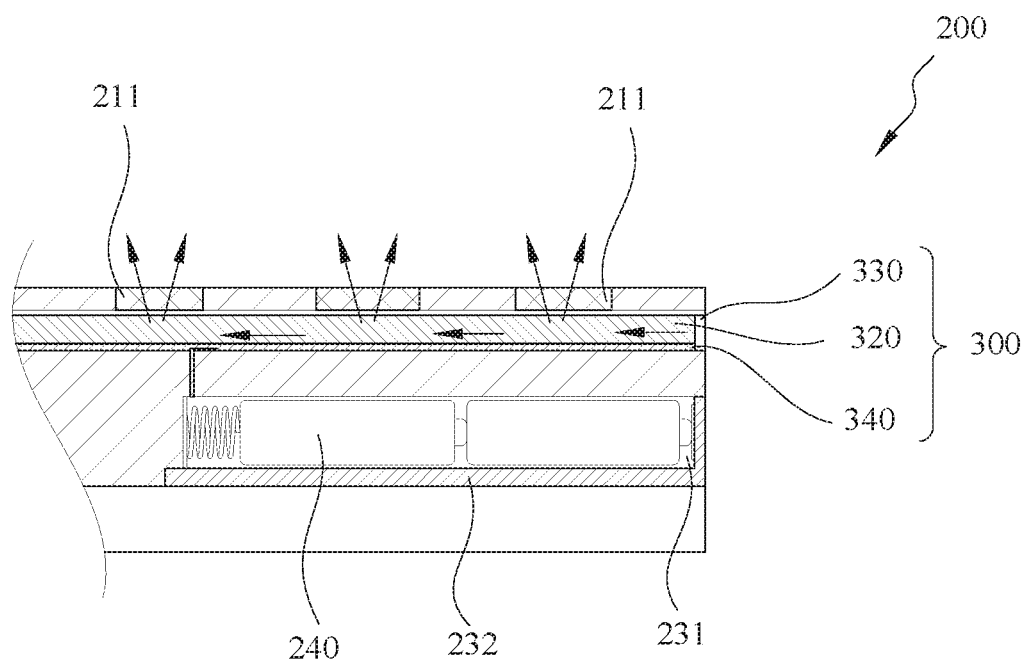
FIG. 9 is a cross-sectional view of the edge side display device according to the fourth embodiment of the present invention in operation.

Upon activation of the power supply 230, a portion of light rays emitted from the LED 330 is guided and is diffused by the light guide plate 320 and is radiated directly outwardly of the plastic strip 200 through the transparent part 211 while a remaining portion of the light rays is reflected from the light reflector 340 disposed below the light guide plate 320 so as to radiate outwardly of the plastic strip 200 through the transparent part 211, as best shown in FIG. 9.

In this embodiment, only one LED 330 is utilized to explain the present invention, but the number of LED 330 and its design should not be limited only thereto and can be increased according to the required illumination. For instance, the light guide plate 320 may have two light incident side surfaces and two LEDs can be disposed at two light incident side surfaces of the light guide plate 320.

Because the flexible light board 310 and the flexible light guide plate 320 serve as the light emitting unit 300, the flexibility provides and facilitates mounting of the same in the curved portion 113 of the chair body and the plastic strip 200 can be press-fitted within the retention channel 114 formed in the peripheral edge of the curved portion 113 of the chair body.

Figure 10:
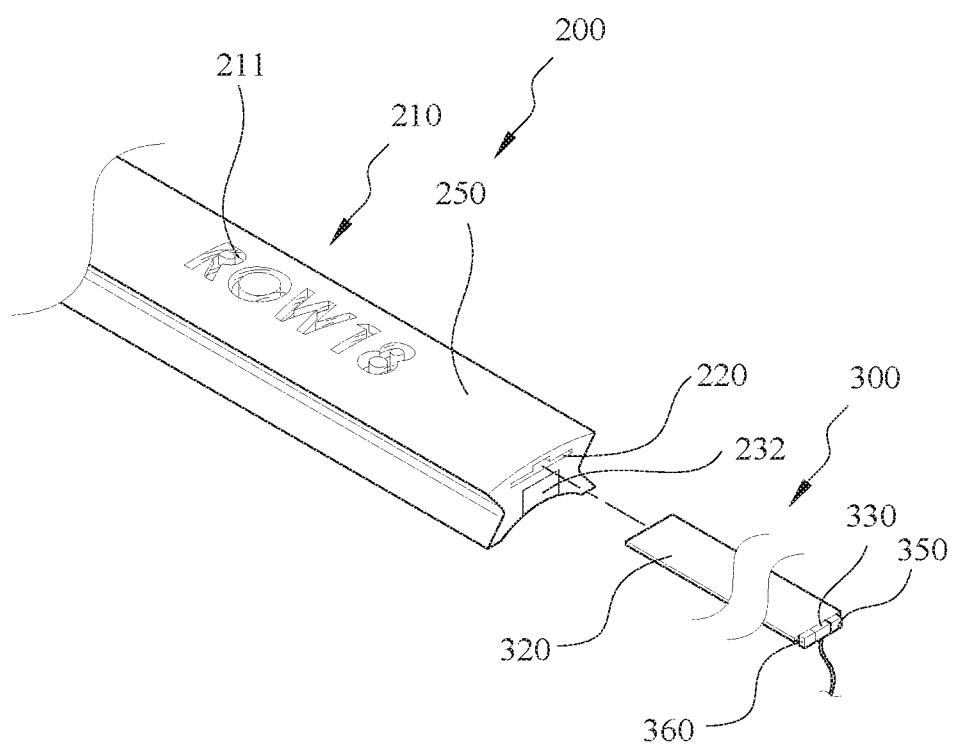
FIG. 10 is a perspective fragmentary view of the plastic strip employed in the edge side display device according to a fifth embodiment of the present invention.

FIG. 10 is a perspective fragmentary view of the plastic strip employed in the edge side display device according to a fifth embodiment of the present invention. The fifth embodiment is similar to the third embodiment, except that a signal receiver 350 and a micro processor 360 are disposed on one end of the light guide plate 320 and are further coupled electrically with the power supply unit 230 such that upon receipt of a control signal from a controller 370, the signal receiver 350 transmits the control signal to the micro processor 360, which activates the power supply unit 230 to supply power according to the control signal. In other words, the emitting light rays of the LED 330 can be controlled by a remote control. To be more specific, the edge side display device of the present invention can be remotely controlled via the controller 370 so as to provide comfort and convenience to the user of the foldable chair.

As explained above, since the edge side display device of the present invention is installed in the external surface of the front legs of the foldable chair, the pattern consisting of word information, like seat serial numbers or symbols are visible by the audience due to light rays emitted from the LEDs, the troubles liking falling off of the seat number from the chairs, finding one's seat in the dim environment with the assistance of a torch light as encountered during used of the conventional foldable chairs can be eliminated.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An edge side display device for a chair, comprising:
   a retention channel of a dovetail shape in cross section; and
   a plastic strip for embedding within said retention channel, having an upper side surface provided with a pattern to be exposed to an exterior of said retention channel such that said pattern is visible from the exterior of said retention channel,
   wherein said pattern has at least one transparent part formed with words, totems, symbols or emblems,
   wherein said plastic strip is embedded with a light emitting unit and a power supply unit coupled electrically to said light emitting unit, wherein said at least one transparent part is located adjacent to said light emitting unit such that lighting rays emitted from said light emitting unit radiate exteriorly of said plastic strip via said at least one transparent part,
   wherein said plastic strip defines a passage extending longitudinally along its entire length, said light emitting unit being disposed within said passage, and
   wherein said power supply unit includes a battery seat mounted at one end of said plastic strip, a battery disposed within said battery seat and a protection cover detachably mounted on said one end of said plastic strip for shielding said battery and said battery seat.

2. The edge side display device according to claim 1, wherein the chair includes a chair body having a peripheral edge side formed with said retention channel, said pattern is formed by screen printing and consists of words, totems, symbols or emblems.

3. The edge side display device according to claim 1, wherein said light emitting unit includes a flexible light board that is installed with a plurality of LEDs (Light Emitting Diodes) and that is coupled electrically with said power supply unit.

4. The edge side display device according to claim 3, further comprising a signal receiver and a microprocessor disposed on said flexible light board, said microprocessor being coupled electrically with said power supply unit such that upon receipt of a control signal from a controller, said signal receiver transmits said control signal to said microprocessor, which activates said power supply unit to supply power according to said control signal.

5. The edge side display device according to claim 1, wherein said light emitting unit includes a light guide plate, a light reflector and at least one LED, wherein said LED is disposed at one end of said light guide plate and coupled electrically with said power supply unit, said light reflector is disposed at one side of said light guide plate such that a portion of light rays emitted from said LED is guided and diffused by said light guide plate and is radiated directly outwardly of said plastic strip through said transparent part while a remaining portion of said light rays is reflected from said light reflector so as to radiate outwardly of said plastic strip through said transparent part.

6. The edge side display device according to claim 5, further comprising a signal receiver and a microprocessor disposed on one end of said light guide plate, said microprocessor being coupled electrically with said power supply unit such that upon receipt of a control signal from a controller, said signal receiver transmits said control signal to said microprocessor, which activates said power supply unit to supply power according to said control signal.

* * * * *